(12) United States Patent
Brukman et al.

(10) Patent No.: US 12,483,571 B2
(45) Date of Patent: Nov. 25, 2025

(54) PROTECTION OF CLOUD STORAGE DEVICES FROM ANOMALOUS ENCRYPTION OPERATIONS

(71) Applicant: Microsoft Technology Licensing, LLC, Redmond, WA (US)

(72) Inventors: Ariel Brukman, Kiryat Ata (IL); Ram Haim Pliskin, Rishon Le Tsion (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 416 days.

(21) Appl. No.: 18/084,251

(22) Filed: Dec. 19, 2022

(65) Prior Publication Data

US 2024/0205249 A1   Jun. 20, 2024

(51) Int. Cl.
*G06N 20/00* (2019.01)
*G06F 21/55* (2013.01)
*H04L 9/40* (2022.01)

(52) U.S. Cl.
CPC ...... *H04L 63/1425* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 2018/0007069 A1 | 1/2018 | Hunt | |
| 2018/0034835 A1* | 2/2018 | Iwanir | H04L 63/1416 |
| 2021/0184948 A1* | 6/2021 | Baker | G06F 11/0709 |
| 2022/0027472 A1* | 1/2022 | Golden | G06F 21/78 |
| 2022/0138320 A1* | 5/2022 | Gehtman | G06F 3/0659 |
| | | | 726/24 |
| 2022/0140995 A1* | 5/2022 | Gehtman | G06F 21/566 |
| | | | 713/165 |
| 2022/0200869 A1* | 6/2022 | Erlingsson | H04L 67/10 |
| 2022/0292196 A1* | 9/2022 | Bhagi | G06F 11/1451 |

(Continued)

OTHER PUBLICATIONS

Anonymous: "Is the Cloud Control Plane a New Frontline in Cybersecurity CSA", Retrieved from https://cloudsecurityalliance.org/blog/2021/06/29/is-the-cloud-control-plane-a-new-frontline-in-cybersecurity, Jun. 29, 2021, pp. 1-3.

(Continued)

*Primary Examiner* — Christopher B Robinson

(57) ABSTRACT

According to examples, an apparatus includes a processor that determines that an encryption operation has been requested or executed through a cloud control plane capability with respect to a cloud storage device. The processor also determines that the requested or executed encryption operation with respect to the cloud storage device is anomalous and, based on a determination that the requested or executed encryption operation with respect to the cloud storage device is anomalous, outputs an alert and/or performs a remedial action. By identifying anomalous encryption operation requests or executions on cloud storage devices, the processor is able to determine that ransomware attacks are or have occurred on the cloud storage devices. In some examples, the processor takes remedial actions to mitigate harm posed by or prevent the ransomware attacks.

19 Claims, 9 Drawing Sheets

(56) References Cited

U.S. PATENT DOCUMENTS

2022/0382837 A1* 12/2022 Shachar ................ G06F 21/316

OTHER PUBLICATIONS

Asatryan Davit, "Is Cloud Storage Safe from Ransomware? (It's Not)", URL:https://spinbackup.com/blog/is-cloud-storage-safe-from-ransomware/, Oct. 18, 2021, pp. 1-9.
International Search Report and Written Opinion received for PCT Application No. PCT/US2023/081219, Mar. 1, 2024, 2024, 18 pages.
Stella Josh., "Why Ransomware Attacks Steer Clear of the Cloud", https://www.fugue.co/blog/why-ransomware-attacks-steer-clear-of-the-cloud, Mar. 18, 2022, pp. 1-8.
International Preliminary Report on Patentability (Chapter I) received for PCT Application No. PCT/US2023/081219, mailed on Jul. 3, 2025, 12 pages.

* cited by examiner

PROTECTION OF CLOUD STORAGE DEVICES FROM ANOMALOUS ENCRYPTION OPERATIONS

BACKGROUND

Ransomware in computer-science refers to a type of crypto-viral action of encrypting a disk that prevents or limits users from accessing their files. In some ransomware attacks, an attacker causes a malicious software (malware) to be executed inside of a machine in which the disk to be attacked is located. The malware encrypts the disk as a whole or encrypts certain files using a secret encryption key and a cipher protocol. In order to decrypt the disk or the files, the user needs to obtain the decryption key and, in some instances, the cipher protocol, from the attacker. However, in a ransomware attack, the attacker does not provide the decryption key (or the cipher protocol) unless the user pays a ransom.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
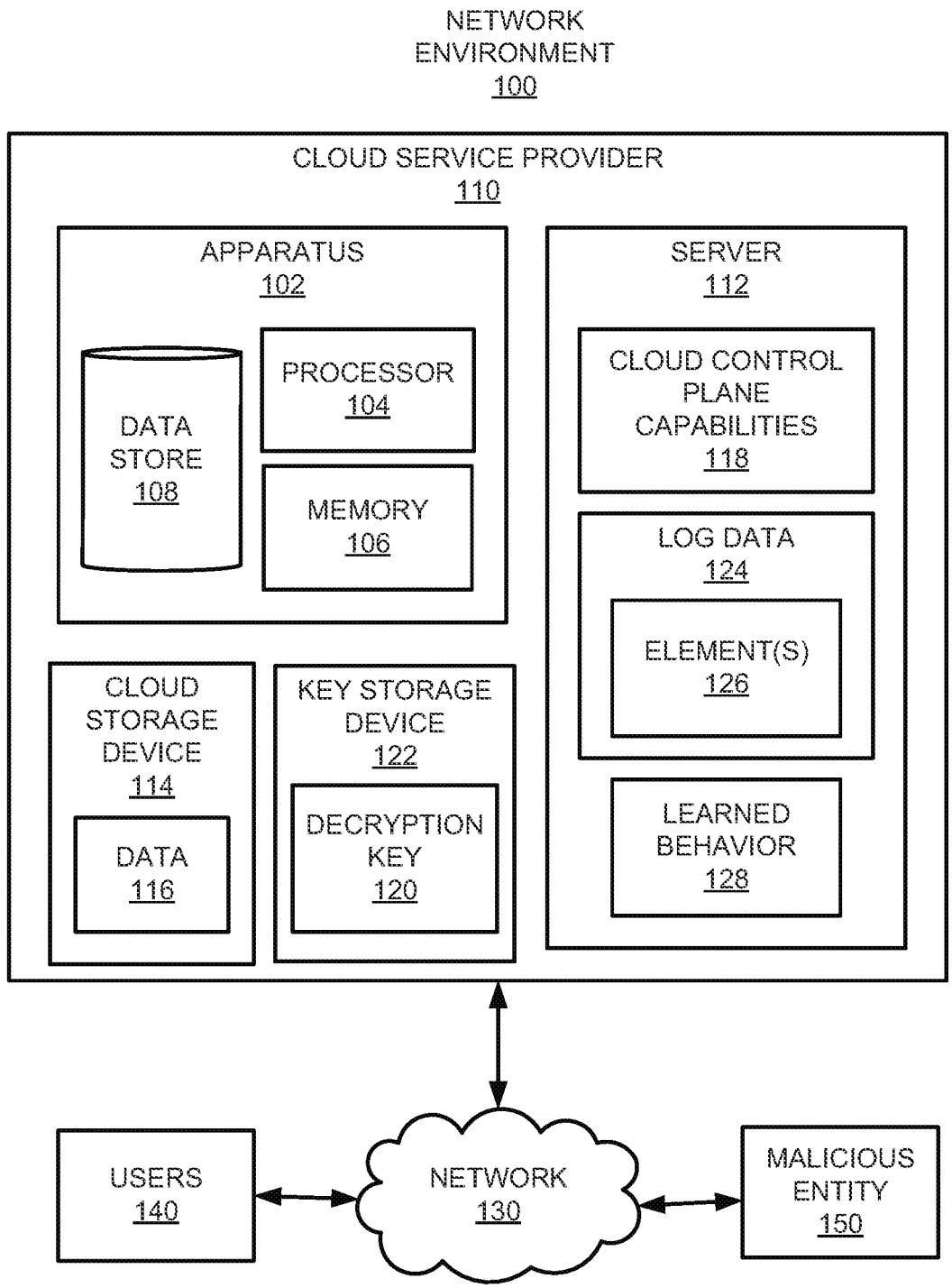
FIG. 1 shows a block diagram of a network environment, in which an apparatus of a cloud service provider is to determine whether a requested or executed encryption operation is anomalous and to take remedial measures based on the determination, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to.

In some ransomware attacks on a storage device, such as an on-premise storage device, e.g., a storage device that is local to a user, or on a cloud-based storage device, an attacker encrypts the storage device using an encryption key and a cipher protocol and stores the corresponding decryption key. The cipher protocol and the decryption key are to be used to decrypt the storage device. In the ransomware attack, the attacker withholds the decryption key from the user or owner of the storage device unless the user or owner pays a ransom for the decryption key. The payment of the ransom is often a monetary payment, a cryptographic currency payment, performance of a task, or the like. In these types of attacks, the attacker often executes a code on the storage device to encrypt the entire disk or certain files that the attacker has selected. There exist defenses against such ransomware attacks on storage devices. These defenses include the search for specific executables, e.g., by a name or a signature of the specific executables running on the storage devices, the search for certain patterns, such as disk access patterns, network patterns, etc., identifying malicious targets, and command and control operation.

A technical issue associated with these defenses is that they often do not work on ransomware attacks that use a cloud infrastructure (e.g., cloud control plane capabilities) to encrypt the cloud storage devices (which may also be termed cloud-based storage devices) because these defenses cannot detect such attacks. These defenses often cannot detect such ransomware attacks on cloud storage devices because attackers often do not execute code, e.g., malware, on the cloud storage devices to encrypt the cloud storage devices. Instead, attackers often use control plane capabilities available through servers that manage the cloud storage devices to encrypt the cloud storage devices. That is, attackers often obtain the credentials of valid users of the cloud storage devices and use the credentials to access the cloud control plane capabilities through which the attackers encrypt the cloud storage devices. The attackers often obtain the credentials through other malicious operations, such as phishing, theft, etc.

Disclosed herein are apparatuses and methods to protect cloud storage devices from anomalous encryption operations, e.g., ransomware attacks on the cloud storage devices. The apparatuses disclosed herein include processors that determine attempts at and executions of ransomware attacks on the cloud storage devices. The processors disclosed herein output alerts and/or perform remedial actions when such attempts or executions of ransomware attacks are determined to have occurred. As disclosed herein, a processor determines that a ransomware attack on a cloud storage device is occurring or has occurred based on a determination that an anomalous request to encrypt the cloud storage device has been identified or an anomalous execution of a cloud storage device encryption has occurred. The processor determines that a request or an execution of an encryption operation is anomalous, in some examples, based on whether a difference between an element (or multiple elements) of the request or execution and a learned behavior (or multiple elements) exceeds a predefined threshold.

In some examples, the processor determines that a ransomware attack on the cloud storage device is occurring or has occurred based on a determination that an anomalous request to delete a decryption key has been identified or an anomalous deletion of the decryption key has occurred. Based on a determination that an attempt at or an execution of a ransomware attack has occurred, the processor outputs an alert regarding the attempt or execution, blocks the attempt, requires an additional credential for the attempt to be executed, and/or the like.

Through implementation of the features of the present disclosure, ransomware attacks on cloud storage devices, which may also be termed cloud-based storage devices, are identified and the harm posed by the ransomware attacks are mitigated or prevented. Technical improvements afforded through implementation of the features of the present disclosure include improved security on the data stored in cloud storage devices by preventing or mitigating ransomware attacks on the cloud storage devices. That is, for instance, the data may in some instances be protected from theft by malicious entities. It should be understood that references made herein to the encryption of a cloud storage device may refer to the encryption of the entire cloud storage device or to the encryption of certain data or files stored on the cloud storage device.

Figure 2:
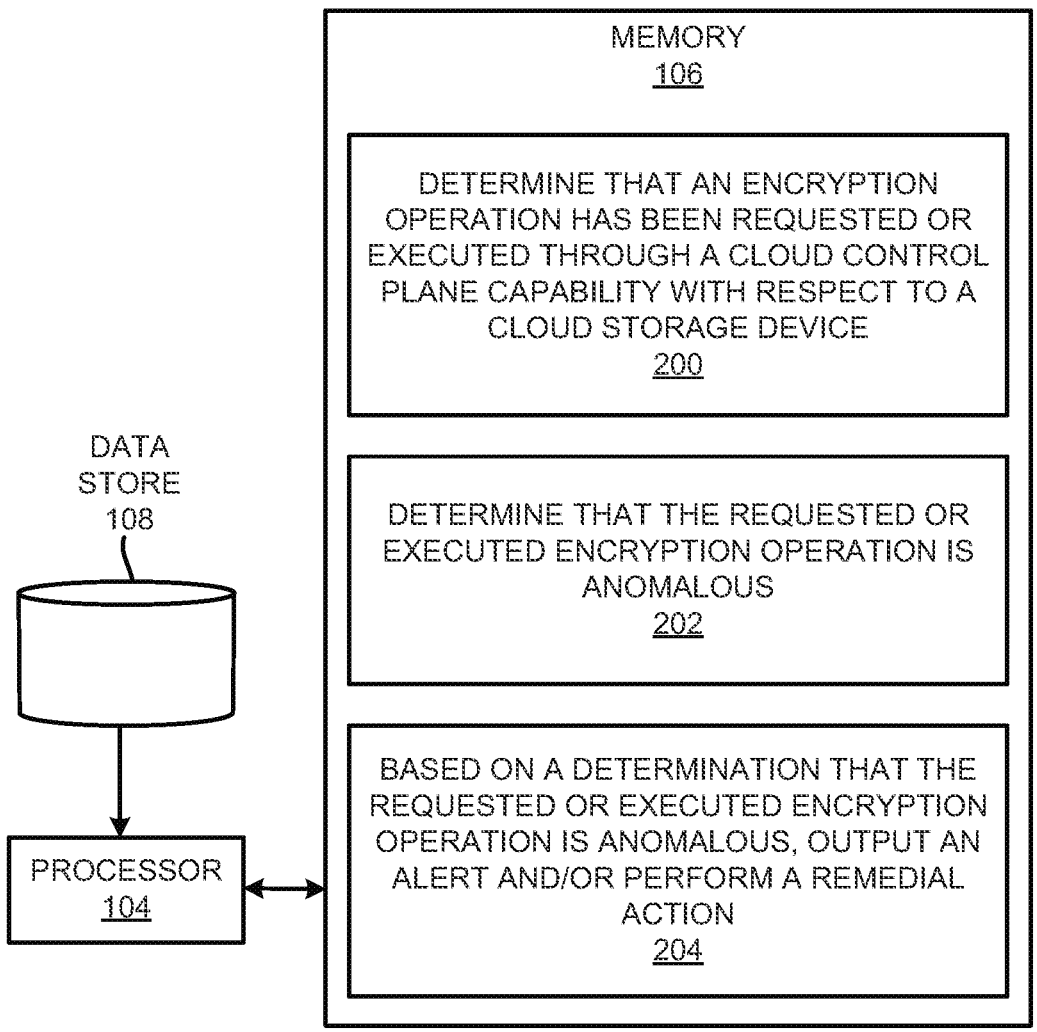
FIG. 2 depicts a block diagram of the apparatus depicted in FIG. 1, in accordance with an embodiment of the present disclosure.

Reference is first made to FIGS. 1 and 2. FIG. 1 shows a block diagram of a network environment 100, in which an apparatus 102 of a cloud service provider 110 is to determine whether a requested or executed encryption operation is anomalous and to take remedial measures based on the determination, in accordance with an embodiment of the present disclosure. FIG. 2 depicts a block diagram of the apparatus 102 depicted in FIG. 1, in accordance with an embodiment of the present disclosure. It should be understood that the network environment 100 and the apparatus 102 may include additional elements and that some of the elements described herein may be removed and/or modified without departing from the scopes of the network environment 100 and/or the apparatus 102.

In some examples, the cloud service provider 110 is a third-party company that offers a platform, infrastructure, applications, data storage services, servers, and/or the like, over a network 130, such as the Internet. In other words, the cloud service provider 110 provides a cloud-based platform and/or cloud-based services to users 140, such as individual users, companies, institutions, and/or the like. The cloud service provider 110 includes a server 112 (or a plurality of servers 112) that provide the cloud-based platform, etc., to the users 140. The cloud service provider 110 also includes a cloud storage device 114 (or a plurality of cloud storage devices 114) on which the users 140 are to store their data 116, files, applications, images, videos, etc. The cloud storage device 114, which may also be termed a cloud-based storage device 114, is a hard disk drive, a solid state storage device, an optical storage device, a and/or the like, that users 140 access through the network 130. Particularly, for instance, a user 140 accesses the cloud storage device 114 through the network 130, the server 112, through a virtual machine, and/or the like. In this regard, the cloud storage device 114 may be a virtual machine attached storage device, e.g., may provide a cloud storage service to users through virtual machines.

Although not shown in FIG. 1, in some examples, the cloud service provider 110 includes additional components to enable communication of data through the network 130. For instance, the server 112 and the cloud storage device 114 are housed in one or more data centers, which include network equipment to enable the communication of the data through the network 130. The network equipment includes gateways, firewalls, switches, and/or the like. In some examples, the server 112 and the cloud storage device 114 are in separate locations and data is communicated between the server 112 and the cloud storage device 114 through the network 130.

In some instances, a malicious entity 150 may attempt to or may execute a ransomware attack on the cloud storage device 114. The malicious entity 150 may be defined as an entity that is not an owner of the data 116 or an entity that is not authorized to access the data 116 stored on the cloud storage device 114. Instead, for instance, the malicious entity 150 may be a person or an application that may have obtained the credentials of a user who is authorized to access the cloud storage device 114. The malicious entity 150 may have obtained the authorized user's credentials maliciously, for instance, through a phishing attack on the authorized user, by stealing the authorized user's credentials, by purchasing the authorized user's credentials from another malicious entity, or the like. The authorized user's credentials may be the user's username, password, and/or a one-time code.

As the malicious entity 150 may have the authorized user's credentials, the malicious entity 150 may access the cloud storage device 114 in manners that are available to the authorized user. For instance, the malicious entity 150 may access the cloud storage device 114 through the server 112, through a virtual machine hosted by the server 112, and/or the like. In this regard, the malicious entity 150 may have access to the same controls over the cloud storage device 114 as the authorized user. In some examples, the malicious entity 150 has access to cloud control plane capabilities 118 available through the server 112. The cloud control plane capabilities 118 include capabilities available to users regarding the management of resources, e.g., data 116, stored in the cloud storage device 114. The cloud control plane capabilities 118 include the ability to encrypt the cloud storage device 114, encrypt certain files on the cloud storage device 114, set roles and permissions associated with the cloud storage device 114, delete decryption keys, and/or the like.

The malicious entity 150 may attempt to encrypt the cloud storage device 114 by submitting a request (which may also be an instruction) to the server 112 via the cloud control plane capabilities 118. In some instances, the attempt is successful and the cloud storage device 114 is encrypted using an encryption key, which the cloud control plane capabilities 118 may generate and provide. When the attempt is successful, the server 112 may identify or generate a decryption key 120 that may be used to decrypt the cloud storage device 114. The decryption key 120 is the same as the encryption key used to encrypt the cloud storage device 114 in instances in which the encryption key and the decryption key are a symmetric key pair. The decryption key 120 may differ from the encryption key in instances in which the encryption key and the decryption key are an asymmetric key pair. In any regard, the server 112 may store the decryption key 120 in a key storage device 122, which may be a secure secrets store, such as a key vault. The encryption key and the decryption key 120 may each be a secret sequence of characters, numbers, and/or symbols that the server 112 may randomly generate.

Following the encryption of the cloud storage device 114, the malicious entity 150 may access and copy the decryption key 120. The malicious entity 150 may also attempt to delete the decryption key 120 from the key storage device 122. The malicious entity 150 may also delete the decryption key 120 through the cloud control plane capabilities 118 available through the server 112. In some instances, the attempt is successful and the decryption key 120 is deleted from the key storage device 122. The malicious entity 150 may seek to delete the decryption key 120 to prevent the decryption key 120 from being used to decrypt the cloud storage device 114. In this regard, the malicious entity 150 may seek to permanently delete the decryption key 120 such that the decryption key 120 may not be retrieved other than from the malicious entity 150. In addition, the malicious entity 150 may hold the decryption key 120 ransom. That is, the malicious entity 150 may not provide the authorized user with the decryption key 120 unless the authorized user pays a ransom, e.g., pays a certain amount of money, pays a certain amount of crypto currency, performs some task, etc.

According to examples and as discussed herein, the cloud service provider 110 includes an apparatus 102 that reduces the occurrence of such attacks, e.g., ransomware attacks, prevents the occurrence of such attacks, and/or mitigates the damage done by such attacks. The apparatus 102 is a type of computing device such as a server, a laptop computer, a desktop computer, a tablet computer, and/or the like. In some examples, the apparatus 102 is a server of the cloud service provider 110, a virtual machine of the cloud server provider 110, a computing device of an Internet technology (IT) professional of the cloud service provider 110, a computing device of an IT professional contracted by the cloud service provider 110, etc. In addition or in other examples, the functionalities of and/or operations that the apparatus 102 performs are distributed across multiple servers, multiple virtual machines, and/or the like, on the cloud.

As shown in FIGS. 1 and 2, the apparatus 102 includes a processor 104 that controls operations of the apparatus 102. The apparatus 102 also includes a memory 106 on which instructions that the processor 104 accesses and/or executes are stored. In addition, the processor 104 includes a data store 108 on which the processor 104 stores various information. The processor 104 is a semiconductor-based microprocessor, a central processing unit (CPU), an application specific integrated circuit (ASIC), a field-programmable gate array (FPGA), and/or other hardware device. The memory 106, which may also be termed a computer readable medium, is, for example, a Random Access memory (RAM), an Electrically Erasable Programmable Read-Only Memory (EEPROM), a storage device, or the like. In some examples, the memory 106 is a non-transitory computer readable storage medium, where the term "non-transitory" does not encompass transitory propagating signals. In any regard, the memory 106 has stored thereon machine-readable instructions that the processor 104 executes. The data store 108 may also be a Random Access memory (RAM), an Electrically Erasable Programmable Read-Only Memory (EEPROM), a storage device, or the like.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and/or multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 are distributed across multiple apparatuses 102 and/or multiple processors 104.

With particular reference to FIGS. 1 and 2, the memory 106 has stored thereon machine-readable instructions 200-204 that the processor 104 is to execute. Although the instructions 200-204 are described herein as being stored on the memory 106 and thus include a set of machine-readable instructions, the apparatus 102 may include hardware logic blocks that may perform functions similar to the instructions 200-204. For instance, the processor 104 may include hardware components that may execute the instructions 200-204. In other examples, the apparatus 102 may include a combination of instructions and hardware logic blocks to implement or execute functions corresponding to the instructions 200-204. In any of these examples, the processor 104 may implement the hardware logic blocks and/or execute the instructions 200-204. As discussed herein, the apparatus 102 may also include additional instructions and/or hardware logic blocks such that the processor 104 may execute operations in addition to or in place of those discussed above with respect to FIG. 2.

The processor 104 is to execute the instructions 200 to determine that an encryption operation has been requested or executed through a cloud control plane capability 118 with respect to a cloud storage device 114. In some examples, the encryption operation is an operation to encrypt the cloud storage device 114 through the cloud control capability 118 provided by the server 112. In some examples, the encryption operation is an operation to delete a decryption key 120 from the key storage device 122. In some examples, the processor 104 accesses log data 124 to determine that the encryption operation has been requested or executed through the cloud control plane capability 118. For instance, the server 112 stores requests and executions of requests made through the cloud control plane capabilities 118 in the log data 124 and the processor 104 identifies the request or execution of the encryption operation from the log data 124.

The processor 104 is to execute the instructions 202 to determine that the requested or executed encryption operation with respect to the cloud storage device 114 is anomalous. In some examples, the processor 104 determines that the requested or executed encryption operation is anomalous based on an analysis of at least one element 126 associated with the requested or executed encryption operation and a trained model. Particularly, the processor 104 is to identify at least one element 126 associated with the request or execution of the encryption operation from the log data 124. The at least one element 126 is a source IP address of the device from which the request was made, a time zone from which the request was received, a geographic location from which the request was made, an identifier of a device from which the request was received, an authentication type of the request, an origin of the request, and/or the like. In addition, the processor 104 is to determine whether the identified at least one element 126 is anomalous with respect to a learned behavior 128 associated with the request or execution of the encryption operation. The learned behavior 128 may also be defined as a normal behavior or normal elements associated with the request or execution of the encryption operation.

In some examples, the processor 104 is to learn the behavior 128 associated with the request or execution of the encryption operation through application of a machine learning operation on past behavior associated with requests and executions of encryption operations. That is, the processor 104 is to apply a machine learning operation on the elements corresponding to the past behavior to determine the learned behavior 128. The past behavior may be the past behavior of an authorized user of the cloud storage device 114, authorized users of the cloud storage device 114, authorized users of multiple cloud storage devices, etc. The processor 104 may apply a suitable machine learning operation on the elements corresponding to the past behavior. In some examples, the processor 104 provides feature vectors of the elements corresponding to the past behavior into the machine learning operation and the machine learning operation determines the learned behavior 128 from the feature vectors. The machine learning operation includes, for instance, linear regression, Naive Bayes, K-means, random forest, and logistic regression.

According to examples, the processor 104 is to execute the instructions 202 to determine that the requested or executed encryption operation with respect to the cloud storage device 114 is anomalous based on a determination that the identified at least one element 126 is anomalous with respect to the learned behavior 128. In some examples, the processor 104 compares feature vector(s) of the element(s) 126 with feature vector(s) of the learned behavior(s) 128 to make this determination while in other examples, the processor 104 compares natural language versions of the element(s) 126 and the learned behavior(s) 128. In some examples, the processor 104 determines that the requested or executed encryption operation with respect to the cloud storage device 114 is anomalous based on the identified at least one element 126 differing from the learned behavior 128 corresponding to the at least one element 126 by a margin that exceeds a predefined threshold. The predefined threshold may be user-defined or may be determined through application of a machine learning operation on past data. For instance, the machine learning operation may take as inputs feature vectors of the at least one element 126, the learned behavior 128 corresponding to the at least one element 126, and data pertaining to instances in which various differences resulted in non-malicious and malicious encryption operations on the cloud storage device 114 or on other cloud storage devices. The output of the machine learning operation may be the threshold, e.g., the predefined threshold, at which the difference may be deemed to be anomalous or potentially malicious. The processor 104 may use any suitable machine learning operation such as, linear regression, Naive Bayes, K-means, random forest, or logistic regression to determine predefined threshold.

In some examples, the predefined threshold may be zero. In these examples, the processor 104 may determine that the requested or executed encryption operation is anomalous when the processor 104 determines that there is any difference between the at least one element 126 and the learned behavior 128 corresponding to the at least one element 126. For instance, the processor 104 may determine that the requested or executed encryption operation is anomalous when the values in the source IP address of the request differs in any respect from the values in the source IP address identified as a learned behavior 128 source IP address. In other examples, the predefined threshold may be some value greater than zero, in which case the processor 104 may determine that the requested or executed encryption operation is not anomalous even though the least significant bit (e.g., the last value) of the source IP address of the request differs from the least significant bit (e.g., the last value) in the learned behavior 128 source IP address.

By way of particular non-limiting example, the at least one element 126 is a geographic location of the device from which the encryption operation was requested and the processor 104 determines that the request is anomalous based on the geographic location differing from a location from which requests associated with the cloud storage device 114 are normally received. The geographic location may be a continent, a country, a state, a county, or the like. As another non-limiting example, the at least one element 126 is a source IP address and the processor 104 determines that the request is anomalous based on the source IP address differing from the source IP address from which requests associated with the cloud storage device 114 are normally received. As a further non-limiting example, the at least one element 126 is a time zone and the processor 104 determines that the request is anomalous based on the time zone from which the request was made differs from the time zone from which requests associated with the cloud storage device 114 are normally received as identified in the learned behavior 128.

In some examples, the processor 104 determines whether each of a plurality of elements 126 differs from the normal behaviors corresponding to the respective elements 126. In these examples, the processor 104 may determine whether the requested or executed encryption operation with respect to the cloud storage device 114 is anomalous based on an analysis of the differences between the elements 126 and the learned behaviors 128 respectively corresponding to the elements 126. For instance, the processor 104 may determine that the requested or executed encryption operation is anomalous when a number of the elements 126 differ beyond respective predefined thresholds with the learned behaviors 128. The predefined thresholds may be user-defined or determined through machine learning operations as discussed herein. By way of example, the processor 104 may determine that the requested or executed encryption operation is anomalous when two or more of the elements 126 differ beyond respective thresholds with the learned behaviors 128. Likewise, the processor 104 may determine that the requested or executed encryption operation is not anomalous when less than two of the elements 126 differ below the respective threshold with the learned behaviors 128 corresponding to the elements 126.

As other examples, the processor 104 may apply weights to the elements 126 such that some of the elements 126 may have a higher weighting than other ones of the elements 126. The weights may be applied according to the relative importance levels of the elements 126, for instance, in determining whether a requested or executed encryption operation is anomalous. The weights may be assigned by a user or may be determined through machine learning operations on the elements 126 and anomalous behaviors as discussed herein. In these examples, the processor 104 may apply a formula to the elements 126 along with their assigned weights to determine a total score for the requested or executed encryption operation, e.g., total score=element1"weight1+element2"weight2 . . . . It should be understood that any other suitable formula may be employed to calculate the total score. In these examples, the learned behavior 128 may correspond to a total score and the processor 104 may determine that a requested or executed encryption operation is anomalous when the total score of the requested or executed encryption operation differs from the learned behavior 128 total score by a margin that exceeds a predefined score threshold. The predefined score threshold may be user-defined or determined through application of a machine learning operation as discussed herein.

The processor 104 is to execute the instructions 204 to, based on a determination that the requested or executed encryption operation with respect to the cloud storage device 114 is anomalous, at least one of output an alert and perform a remedial action, e.g., output an alert and/or perform a remedial action. The processor 104 may output an alert to an authorized user of the cloud storage device 114, an administrator of the cloud service provider 110, an IT personnel of the cloud service provider 110, and/or the like. The alert may be an email, a text message, a notification through an application, and/or the like. The alert may include information pertaining to the anomalous activity, such as the elements 126 associated with the request for or execution of the anomalous encryption operation. In addition, the remedial action may be an action to block execution of an encryption request, an action to block the execution of a decryption key deletion request, and/or the like. In some examples, the processor 104 takes the remedial actions itself, e.g., block the execution of certain requests entered into the server 112 through the cloud control plane capabilities 118.

According to examples, the processor 104 is to execute the instructions 200 to determine that an encryption operation on the cloud storage device 114 has been requested, e.g., a request to encrypt the cloud storage device 114 using an encryption key has been received by the server 112. That is, the requested encryption operation is a request to encrypt the cloud storage device 114 through the cloud control plane capabilities 118 available through the server 112. In these examples, the processor 104 is to identify at least one element 126 associated with the request to encrypt the cloud storage device 114.

In addition, the processor 104 is to execute the instructions 202 to determine that the at least one element 126 associated with the request to encrypt the cloud storage device 114 is anomalous. That is, for example, the processor 104 may determine whether the source IP address, the geographic location, and/or the like, of the device through which the request was submitted differs from the learned behavior 128 corresponding to the at least one element 126 by greater than a predefined threshold. The processor 104 may determine that the request is anomalous based on a determination that the source IP address, the geographic location, and/or the like, of the device through which the request was submitted differs from the learned behavior 128 corresponding to that element 126.

Furthermore, based on a determination that the at least one element 126 associated with the request is anomalous, e.g., differs from the normal elements as identified in the learned behavior 128, the processor 104 is to execute the instructions 204 to output an alert as discussed herein. In addition, or alternatively, the processor 104 is to execute the instructions 204 to perform a remedial action with respect to the request. For instance, the processor 104 prevents the cloud storage device 114 from being encrypted responsive to the request. As another example, the processor 104 outputs a notification to the requester of the request to encrypt the cloud storage device 114 to provide additional authentication information. For instance, the processor 104 may send a one-time code to a cellular telephone number or email address on file for the authorized user and may request that the one-time code be sent back to the processor 104. If the correct one-time code is provided, the processor 104 may execute the request to encrypt the cloud storage device 114. However, if an incorrect one-time code is provided, the processor 104 may block the encryption of the cloud storage device 114.

According to examples, the processor 104 is to execute the instructions 200 to determine that an encryption operation has been executed on the cloud storage device 114 using an encryption key. That is, the processor may determine that the request to encrypt the cloud storage device 114 has been fulfilled and the cloud storage device 114 has been encrypted. In these examples, a decryption key 120 associated with the encryption key used to encrypt the cloud storage device 114 is stored in the key storage device 122. The decryption key 120 is the same as the encryption key (symmetric key) or differs from the encryption key (asymmetric key).

In addition, the processor 104 is to identify at least one element 126 associated with the encryption of the cloud storage device 114. The processor 104 is also to execute the instructions 202 to determine whether the identified at least one element 126 associated with the encryption of the cloud storage device 114 is anomalous. That is, for example, the processor 104 may determine whether the source IP address, the geographic location, and/or the like, of the device through which the request to encrypt the cloud storage device 114 was submitted differs from the learned behavior 128 corresponding to the element 126 beyond a predefined threshold. The processor 104 may determine that the encryption of the cloud storage device 114 is anomalous based on a determination that the source IP address, the geographic location, and/or the like, of the device through which the request was submitted differs from the learned behavior 128 corresponding to the element 126 by more than the predefined threshold.

Moreover, based on the identified at least one element 126 being determined to be anomalous, the processor 104 is to execute the instructions 204 to output an alert as discussed herein. In addition, or alternatively, the processor 104 is to execute the instructions 204 to perform a remedial action corresponding to the encryption of the cloud storage device 114. For instance, the processor 104 may prevent the decryption key 120 corresponding to the encryption key used to encrypt the cloud storage device 114 from being deleted from the key storage device 122. By preventing the decryption key 120 from being deleted, an authorized user of the cloud storage device 114 is able to decrypt the encrypted cloud storage device 114 using the stored decryption key 120 without relying on a malicious entity 150 providing the decryption key 120.

According to examples, the processor 104 is to execute the instructions 200 to determine that an encryption operation has been requested, in which the requested encryption operation is a request to delete a decryption key 120 from a key storage device 122. The request to delete the decryption key 120 may be submitted through the cloud control plane capabilities 118. In addition, the processor 104 may determine that the request to delete the decryption key 120 has been received from information contained in the log data 124.

In these examples, the processor 104 is to identify at least one element 126 associated with the request to delete the decryption key 120 from the key storage device 122. The at least one element 126 may include any of the elements discussed herein and the processor 104 may identify the at least element 126 from the information stored in the log data 124. The processor 104 is to execute the instructions 202 to determine whether the at least one element 126 associated with the request to delete the decryption key 120 from the key storage device 122 is anomalous. The processor 104 may make this determination based on an analysis of the at least one element 126 with respect to the learned behavior 128, e.g., whether the at least one element 126 is abnormal.

Furthermore, based on a determination that the at least one element 126 associated with the request to delete the decryption key 120 is anomalous, the processor 104 is to execute the instructions 204 to output an alert as discussed herein. In addition, or alternatively, the processor 104 is to execute the instructions 204 to perform a remedial action. For instance, the processor 104 is to prevent or block the decryption key 120 from being deleted from the key storage device 122. As another example, the processor 104 may output a notification to the requester of the request to delete the decryption key 120 to provide additional authentication information. For instance, the processor 104 may send a one-time code to a cellular telephone number or an email address on file for the authorized user and may request that the one-time code be sent back to the processor 104. If the correct one-time code is provided, the processor 104 may execute the request to delete the decryption key 120 from the key storage device 122. However, if an incorrect one-time code is provided, the processor 104 may block the deletion of decryption key 120 from the key storage device 122.

According to examples, the processor 104 is to execute the instructions 200 to determine that an encryption operation has been requested, in which the requested encryption operation is a request to delete a decryption key 120 from a key storage device 122. The request to delete the decryption key 120 may be a request submitted through the cloud control plane capabilities 118. In addition, the processor 104 may determine that the request to delete the decryption key 120 has been received from information contained in the log data 124.

In these examples, the processor 104 is to identify a length of time between when the cloud storage device 114 was encrypted using an encryption key and when the request to delete the decryption key 120 was received. The processor 104 is to determine whether the identified length of time falls below a predefined time period. The predefined time period may be determined through testing, machine learning, etc. In some examples, the length of the predefined time period may be determined and stored as learned behavior 128. For instance, the length of the predefined time period may be based on a normal, e.g., an average of past behavior, length of time between when the cloud storage device 114 is encrypted and the decryption key 120 is deleted, if at all. The predefined time period may be determined from historical data of a particular user that is authorized to access the cloud storage device 114 or from historical data of multiple users that are authorized to access multiple cloud storage devices.

Based on the identified length of time falling below the predefined time period, the processor 104 is to execute the instructions 202 to determine that the request to delete the decryption key 120 from the key storage device 122 is anomalous. The processor 104 is also to execute the instructions 204 to at least one of output an alert and perform a remedial action based on the determination that the request to delete the decryption key 120 is anomalous. However, based on the identified length of time exceeding the predefined time period, the processor 104 is to determine that the request to delete the decryption key 120 from the key storage device 122 may not be anomalous. In these instances, the processor 104 may determine whether the request to delete the decryption key 120 is anomalous, for instance, as discussed above with respect to the method 600. In other examples, the processor 104 may allow the decryption key 120 to be deleted from the key storage device 122.

According to examples, the processor 104 is to execute the instructions 200 to determine that an encryption operation has been executed, in which the executed encryption operation is a deletion of a decryption key 120 from a key storage device 122. As discussed herein, the decryption key 120 is associated with an encryption key that was used to encrypt the cloud storage device 114. In these examples, the processor 104 is to determine that the decryption key 120 was deleted from the key storage device 122 from information contained in the log data 124.

In addition, the processor 104 is to identify at least one element 126 associated with the deletion of the decryption key 120 from the key storage device 122. For instance, the processor 104 is to identify at least one element 126 associated with the request to delete the decryption key 120. In addition, the processor 104 is to execute the instructions 202 to determine whether the at least one element 126 associated with the deletion of the decryption key 120 from the key storage device 122 is anomalous. The processor 104 may make this determination based on an analysis of the at least one element 126 with respect to the learned behavior 128.

Moreover, based on a determination that the at least one element 126 associated with the deletion of the decryption key 120 is anomalous, the processor 104 is to execute the instructions 204 to output the alert as discussed herein. In addition, or alternatively, the processor 104 is to execute the instructions 204 to perform a remedial action. For instance, the processor 104 is to prevent another decryption key from being deleted from the key storage device to minimize the number of cloud storage devices 114 and/or data 116 that may be held for ransom.

Various manners in which the processor 104 of the apparatus 102 operates are discussed in greater detail with respect to the methods 300-800 depicted in FIGS. 3-8. Particularly, FIGS. 3-8, respectively, depict flow diagrams of methods 300-800 for protecting cloud storage devices from anomalous encryption operations, e.g., ransomware attacks, in accordance with embodiments of the present disclosure. As discussed herein, the cloud storage devices are storage devices that users 140 access through a network, such as the Internet, or virtual machine attached storage devices, e.g., may provide cloud storage services to users through virtual machines. It should be understood that the methods 300-800 may include additional operations and that some of the operations described therein may be removed and/or modified without departing from the scopes of the methods 300-800. The descriptions of the methods 300-800 are made with reference to the features depicted in FIGS. 1 and 2 for purposes of illustration. The methods 400-800 relate to the method 300 in that the methods 400-800 are specific examples of the method 300.

Figure 3:
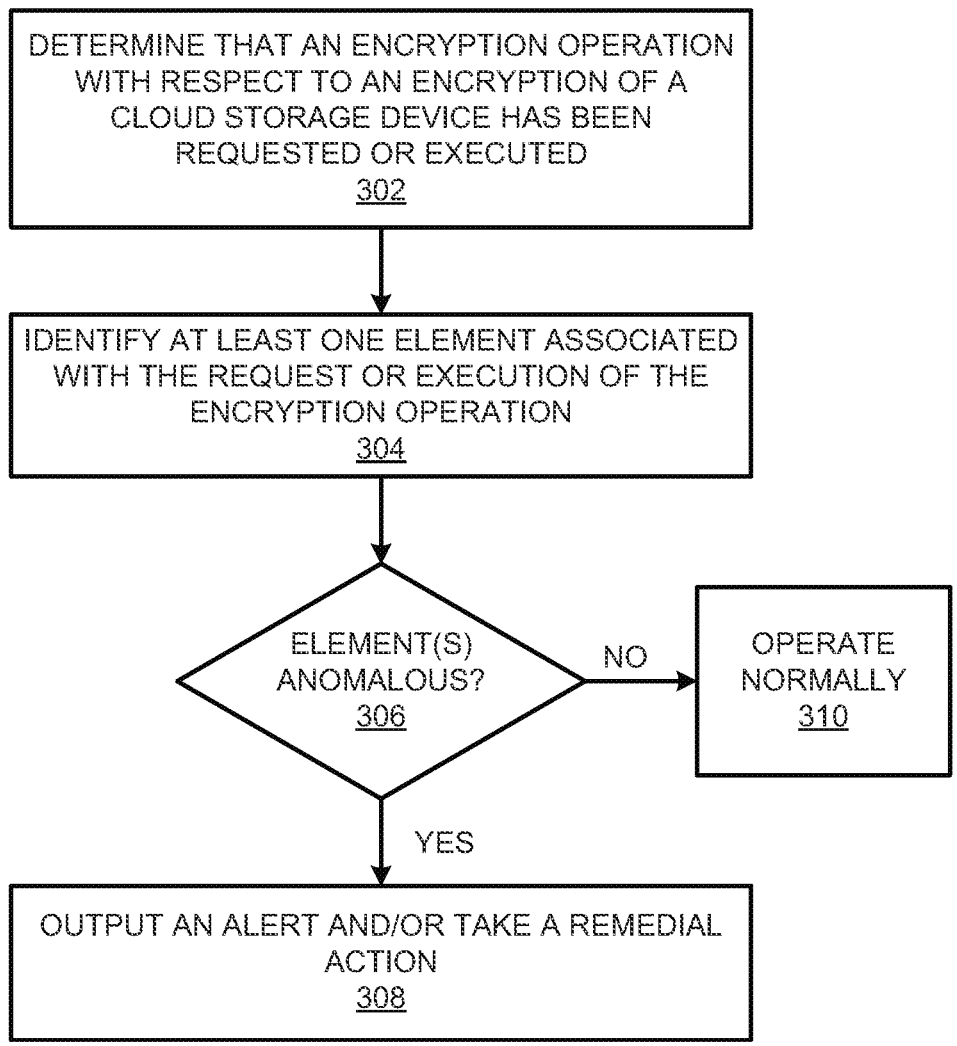
FIGS. 3-8, respectively, depict flow diagrams of methods for protecting cloud storage devices from anomalous encryption operations, e.g., ransomware attacks, in accordance with embodiments of the present disclosure.

With reference first to the method 300 depicted in FIG. 3, at block 302, the processor 104 determines that an encryption operation with respect to an encryption of a cloud storage device 114 has been requested or executed. At block 304, the processor 104 identifies at least one element 126 associated with the request or execution of the encryption operation. The processor 104 may identify the at least one element 126 from information contained in a log data 124. At block 306, the processor 104 determines whether the at least one element 126 associated with the requested or executed encryption operation is anomalous. In some examples, the processor 104 determines whether the at least one element 126 is anomalous with respect to a learned behavior 128 associated with the request or execution of the encryption operation. That is, the processor 104 determines whether the at least one element 126 differs from a learned behavior 128 corresponding to the at least one element 126 by more than a predefined threshold margin. At block 308, based on a determination that the requested or executed encryption operation with respect to the cloud storage device 114 is anomalous, the processor 104 at least one of outputs an alert and performs a remedial action.

However, at block 310, based on a determination that the requested or executed encryption operation with respect to the cloud storage device 114 is not anomalous, the processor 104 operates normally. That is, the processor 104 may take no action or may enable the requested encryption operation to be executed.

Figure 4:
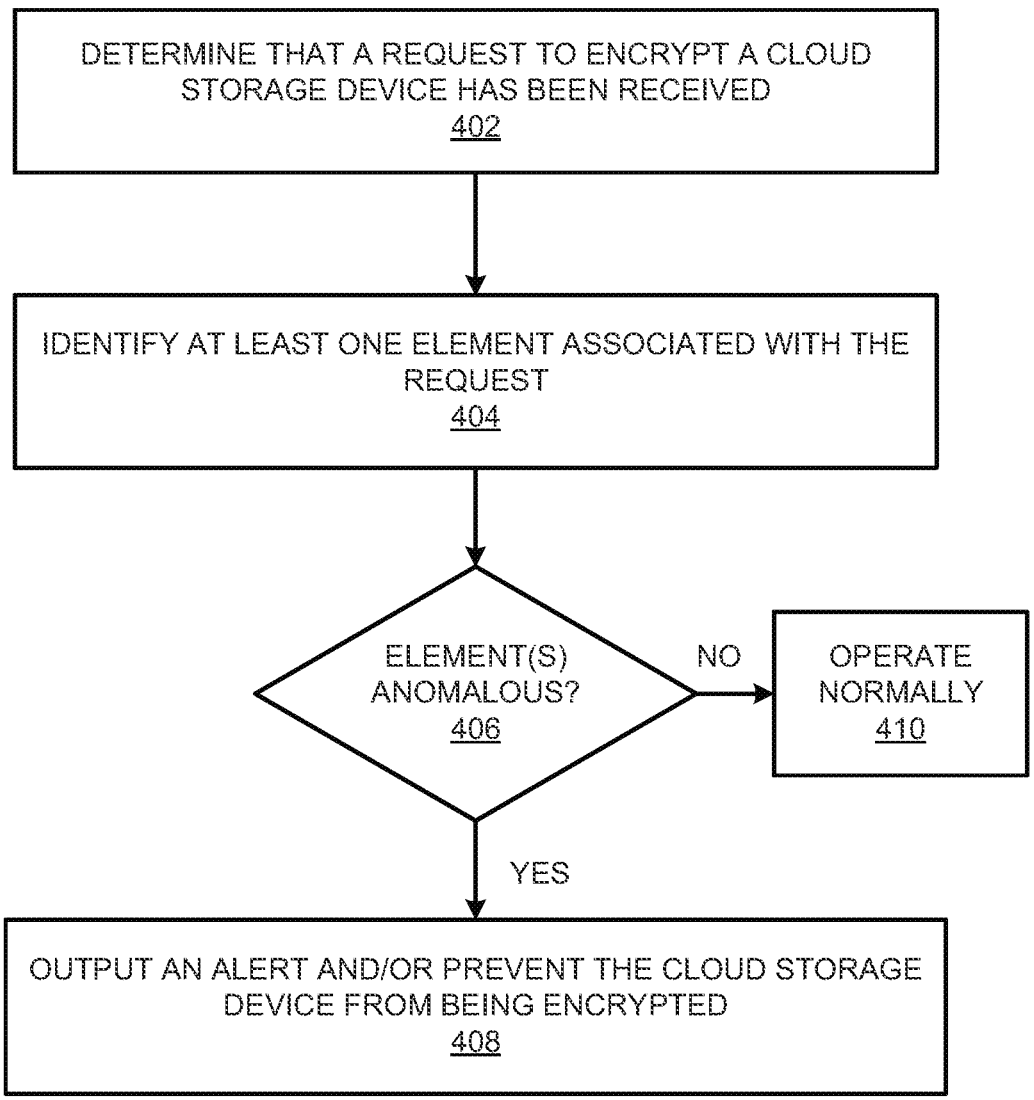

Turning now to the method 400 depicted in FIG. 4, at block 402, the processor 104 determines that the requested encryption operation is a request to encrypt the cloud storage device 114 using an encryption key. In other words, the processor 104 determines that the server 112 received a request to encrypt a cloud storage device 114 from an authorized user 140 or a malicious entity 150. As discussed herein, the server 112 may receive the request from the authorized user 140 or the malicious entity 150 through a cloud control plane capability 118 provided by the server 112.

At block 404, the processor 104 identifies at least one element 126 associated with the request of the encryption operation. At block 406, the processor 104 determines whether the at least one element 126 associated with the request to encrypt the cloud storage device 114 is anomalous. At block 408, based on a determination that the at least one element 126 associated with the request is anomalous, the processor 104 at least one of outputs the alert and prevents the cloud storage device 114 from being encrypted responsive to the request to encrypt the cloud storage device 114 to perform the remedial action.

However, at block 410, based on a determination that the at least one element 126 is not anomalous, the processor 104 operates normally. That is, the processor 104 may take no action or may enable the requested encryption operation to be executed.

Figure 5:
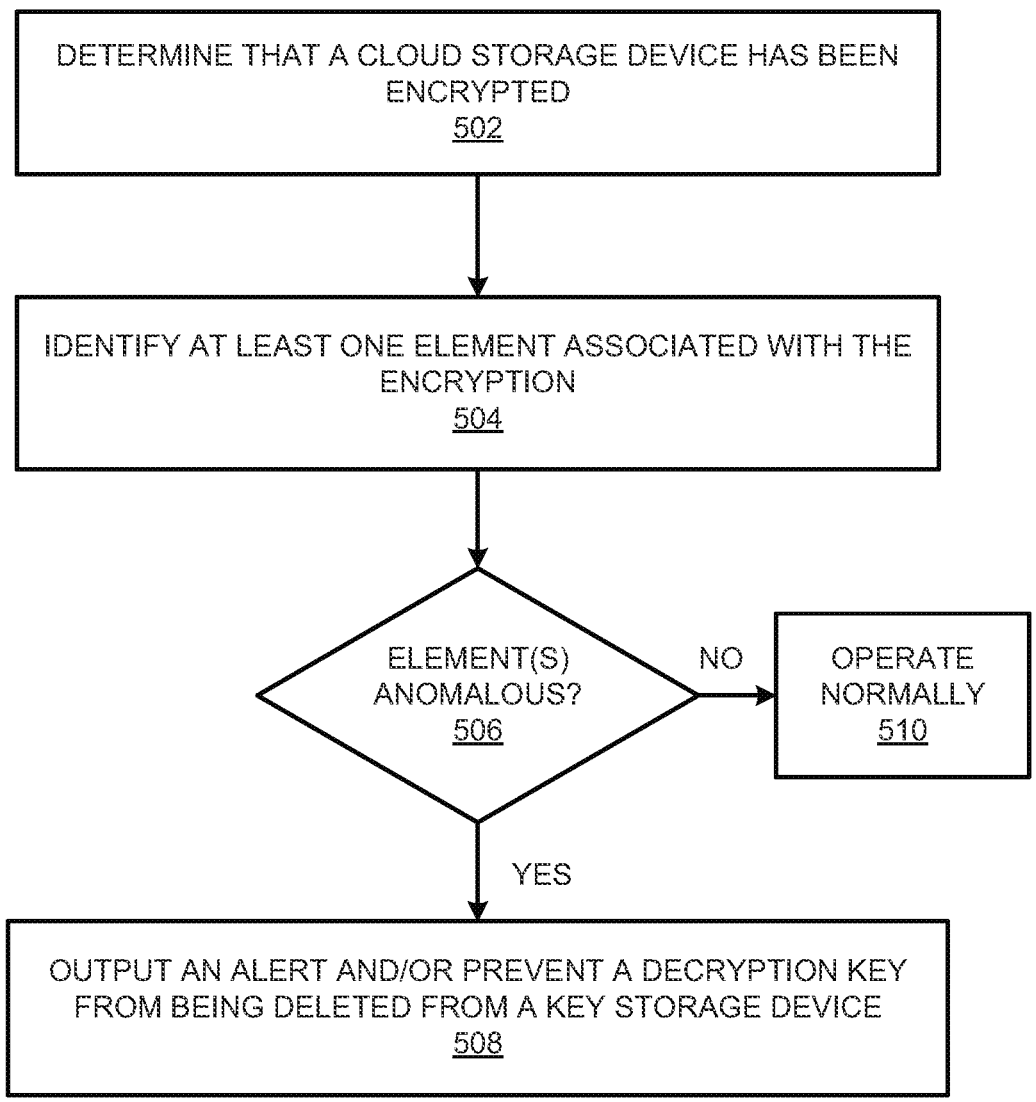

With reference to the method 500 depicted in FIG. 5, at block 502, the processor 104 determines that the cloud storage device 114 has been encrypted using an encryption key. The server 112 is to generate a decryption key 120 associated with the encryption key, in which the decryption key 120 is to be used to decrypt the encrypted cloud storage device 114. The server 112 also stores the decryption key 120 in a key storage device 122 such that the decryption key 120 may be accessed at a later time to decrypt the encrypted cloud storage device 114.

At block 504, the processor 104 identifies at least one element 126 associated with the encryption of the cloud storage device 114. At block 506, the processor 104 determines whether the identified at least one element 126 associated with the encryption of the cloud storage device 114 is anomalous. At block 508, based on the identified at least one element 126 being determined to be anomalous, the processor 104 at least one of outputs the alert and prevents the decryption key 120 corresponding to the encryption key from being deleted from the key storage device 122 to perform the remedial action.

However, at block 510, based on a determination that the at least one element 126 is not anomalous, the processor 104 operates normally. That is, the processor 104 may take no action or may enable the requested encryption operation to be executed, e.g., the decryption key 120 to be deleted from the key storage device 122.

Figure 6:
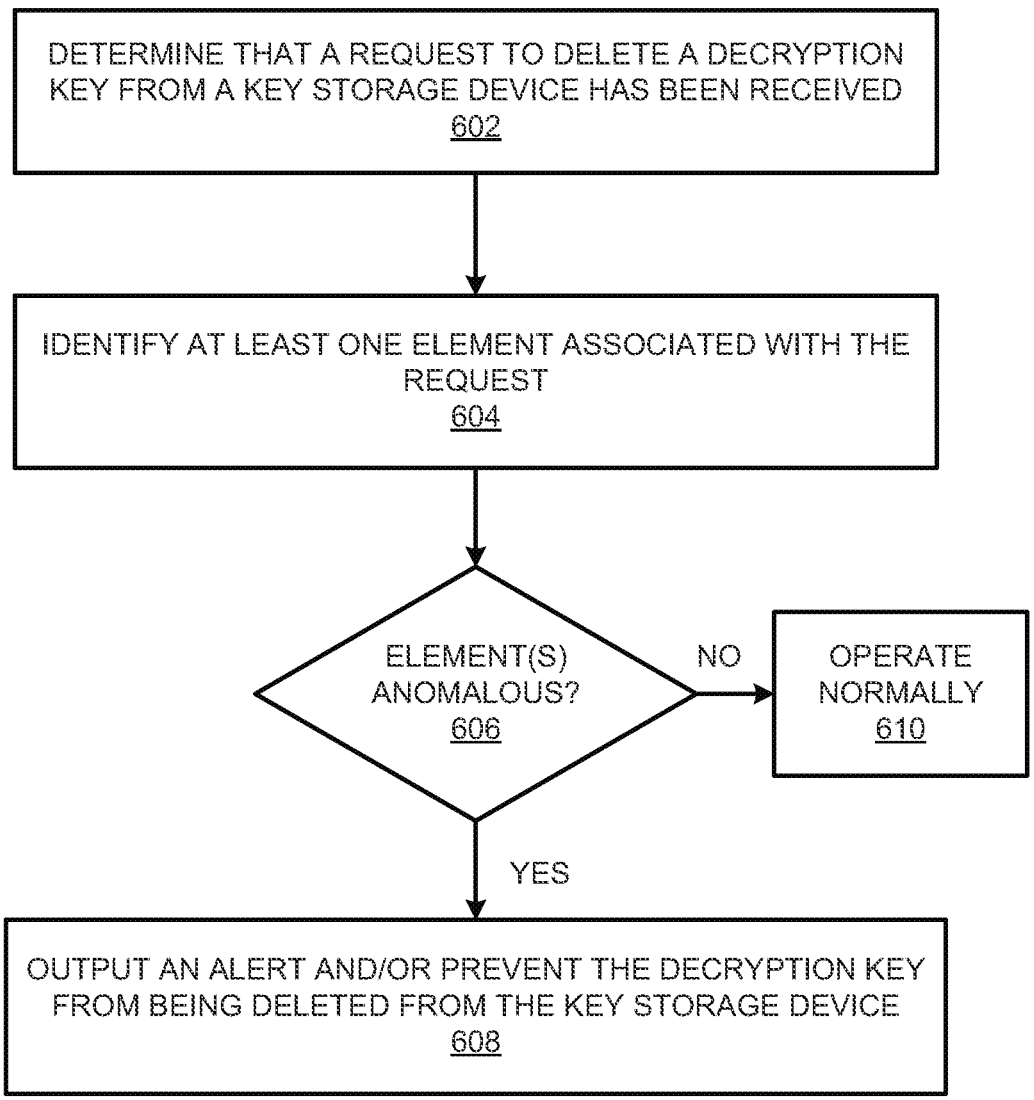

With reference to the method 600 depicted in FIG. 6, at block 602, the processor 104 determines that an encryption operation request is a request to delete a decryption key 120 from a key storage device 122. At block 604, the processor 104 identifies at least one element 126 associated with the request to delete the decryption key 120. At block 606, the processor 104 determines whether at least one element 126 associated with the request to delete the decryption key 120 from the key storage device 122 is anomalous. At block 608, based on a determination that the at least one element 126 associated with the request is anomalous, the processor 104 at least one of outputs the alert and prevents the decryption key from being deleted from the key storage device to perform the remedial action.

However, at block 610, based on a determination that the at least one element 126 is not anomalous, the processor 104 operates normally. That is, the processor 104 may take no action or may enable the requested encryption operation to be executed, e.g., the decryption key 120 to be deleted from the key storage device 122.

Figure 7:
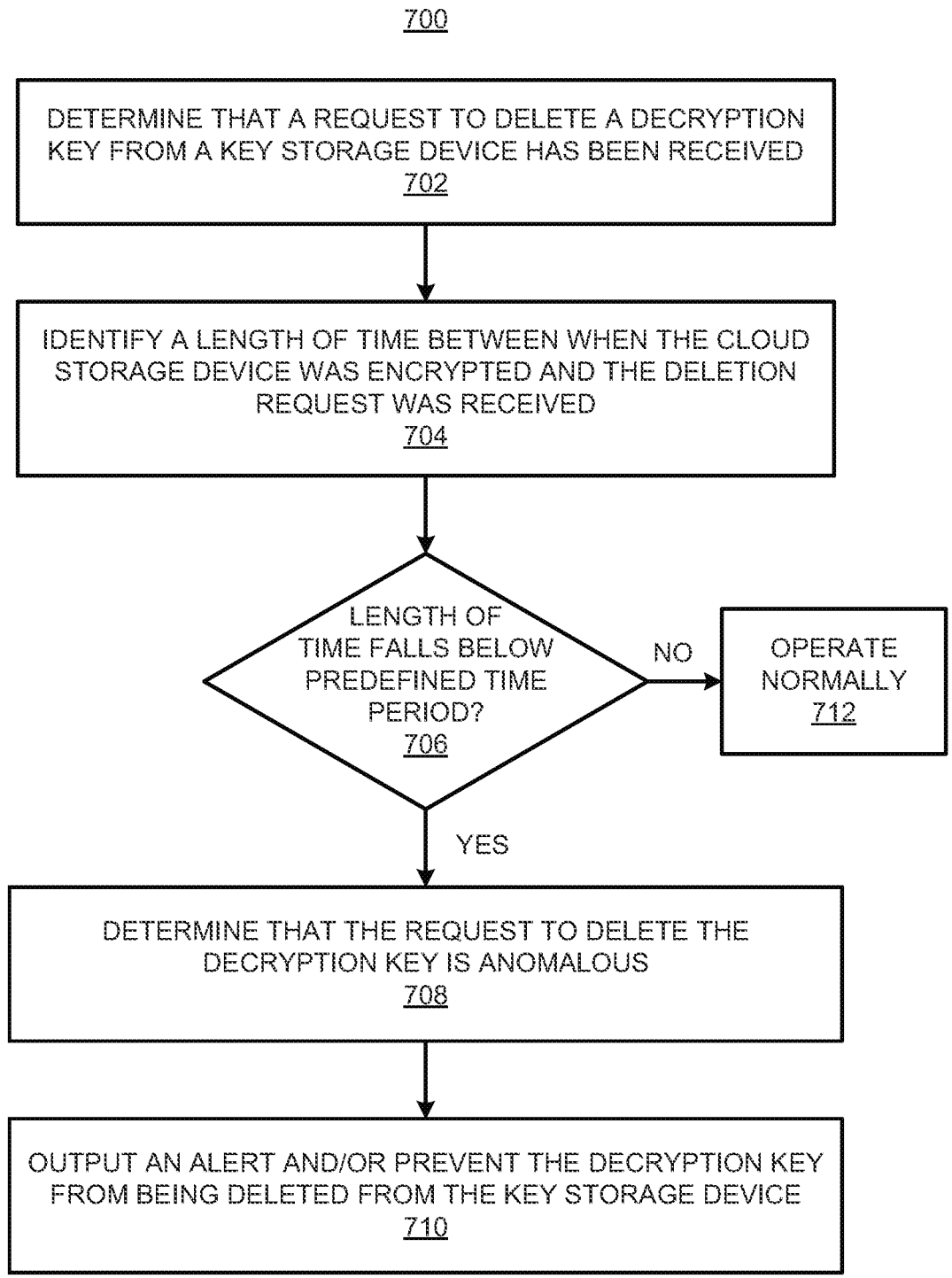

With reference to the method 700 depicted in FIG. 7, at block 702, the processor 104 determines that an encryption operation request is a request to delete a decryption key 120 from a key storage device 122. At block 704, the processor 104 identifies a length of time between when the cloud storage device 114 was encrypted using an encryption key associated with the decryption key 120 and when the request to delete the decryption key 120 was received. At block 706, the processor 104 determines whether the identified length of time falls below a predefined time period. At block 708, the processor 104 determines that the request to delete the decryption key 120 from the key storage device 122 is anomalous based on the identified length of time falling below the predefined time period. At block 710, the processor 104 at least one of outputs the alert and prevents the decryption key 120 from being deleted from the key storage device 122 to perform the remedial action.

However, at block 712, based on a determination that the at least one element 126 is not anomalous, the processor 104 operates normally. That is, the processor 104 may take no action or may enable the requested encryption operation to be executed, e.g., the decryption key 120 to be deleted from the key storage device 122. In other examples, the processor 104 operates normally by determining whether the request to delete the decryption key 120 from the key storage device 122 is abnormal for other reasons. For instance, the processor 104 executes blocks 604-610 as discussed above with respect to the method 600 depicted in FIG. 6.

Figure 8:
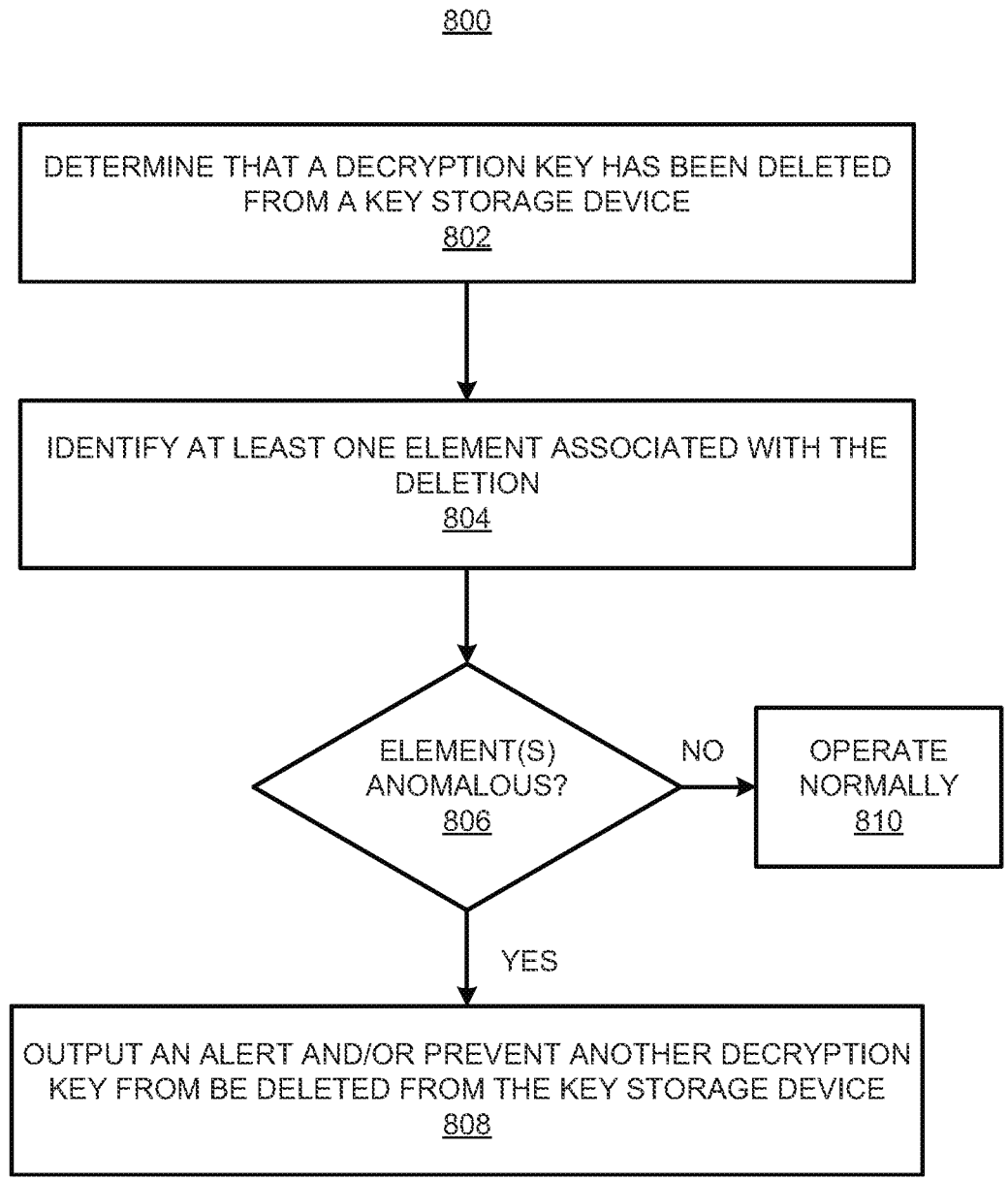

With reference to the method 800 depicted in FIG. 8, at block 802, the processor 104 determines that the executed encryption operation is a deletion of a decryption key 120 from a key storage device 122. At block 804, the processor 104 identifies at least one element 126 associated with the deletion of the decryption key 120 from the key storage device 122. As discussed herein, the deletion of the decryption key 120 is a permanent deletion of the decryption key 120, e.g., the decryption key 120 may not be retrievable following its deletion. At block 806, the processor 104 determines whether the at least one element 126 associated with the deletion of the decryption key 120 from the key storage device 122 is anomalous. At block 808, based on a determination that the at least one element 126 associated with the deletion of the decryption key 120 is anomalous, the processor 104 at least one of outputs the alert and prevents another decryption key from being deleted from the key storage device 122 to perform the remedial action.

However, at block 810, based on a determination that the at least one element 126 is not anomalous, the processor 104 operates normally. That is, the processor 104 may take no action.

In some examples, some or all of the operations set forth in the methods 300-800 are included as utilities, programs, or subprograms, in any desired computer accessible medium. In some examples, the methods 300-800 ae embodied by computer programs, which may exist in a variety of forms both active and inactive. For example, the computer programs exist as machine-readable instructions, including source code, object code, executable code or other formats. Any of the above, in some examples, are embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 9:
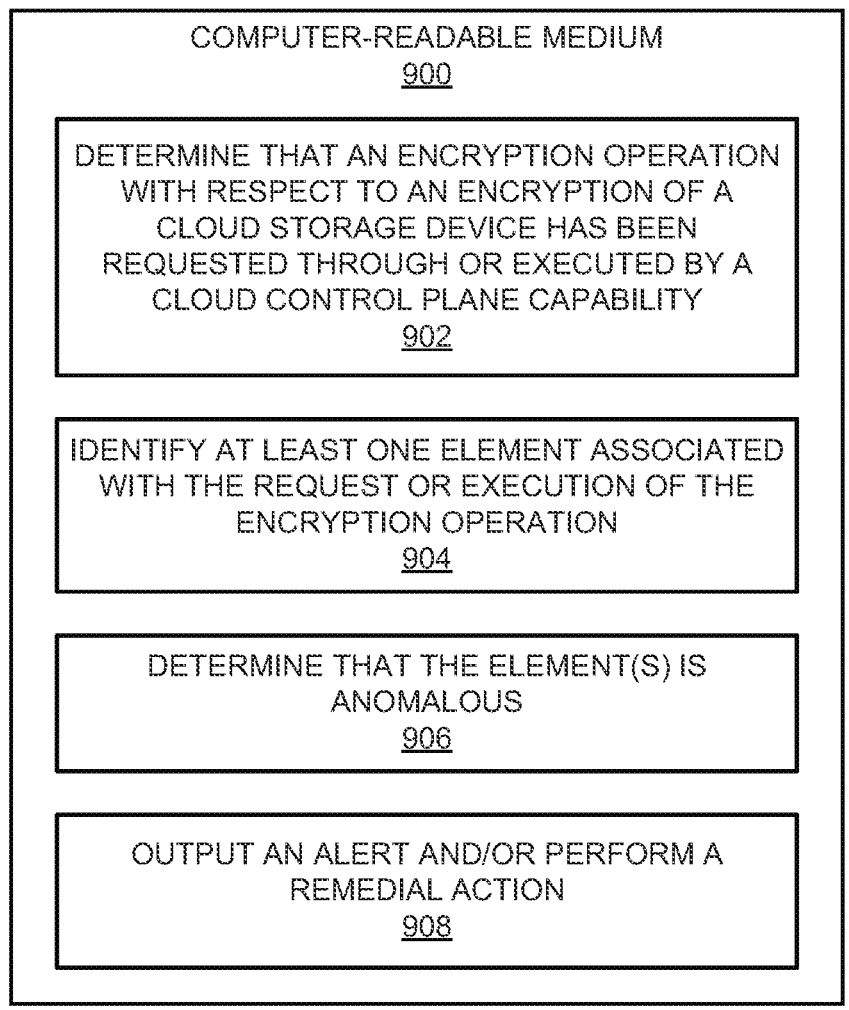
FIG. 9 shows a block diagram of a computer-readable medium that has stored thereon computer-readable instructions for protecting a cloud storage device from an anomalous encryption operation, e.g., a ransomware attack, in accordance with an embodiment of the present disclosure.

Turning now to FIG. 9, there is shown a block diagram of a computer-readable medium 900 that has stored thereon computer-readable instructions for protecting a cloud storage device from an anomalous encryption operation, e.g., a ransomware attack, in accordance with an embodiment of the present disclosure. It should be understood that the computer-readable medium 900 depicted in FIG. 9 may include additional instructions and that some of the instructions described herein may be removed and/or modified without departing from the scope of the computer-readable medium 900 disclosed herein. In some examples, the computer-readable medium 900 is a non-transitory computer-readable medium, in which the term "non-transitory" does not encompass transitory propagating signals.

As shown in FIG. 9, the computer-readable medium 900 has stored thereon computer-readable instructions 902-908 that a processor, such as a processor 104 of the apparatus 102 depicted in FIGS. 1, 2A, and 2B, executes. The computer-readable medium 900 is an electronic, magnetic, optical, or other physical storage device that contains or stores executable instructions. The computer-readable medium 900 is, for example, Random Access memory (RAM), an Electrically Erasable Programmable Read-Only Memory (EEPROM), a storage device, an optical disc, and the like.

The processor executes the instructions 902 to determine that an encryption operation with respect to an encryption of a cloud storage device 114 has been requested through or executed by a cloud control plane capability 118 available from a cloud service provider 110. As discussed herein, the encryption operation is a request to encrypt the cloud storage device 114, an encryption of the cloud storage device 114, a request to delete a decryption key 120 associated with an encryption key used to encrypt the cloud storage device 114 from a key storage device 122, or a deletion of the decryption key 120 from the key storage device 122.

The processor executes the instructions 904 to identify at least one element 126 associated with the request or execution of the encryption operation. In some examples, the processor identifies the at least one element 126 from information in a log data 124. The processor executes the instructions 906 to determine that the at least one element 126 associated with the requested or executed encryption operation is anomalous based on whether a difference between the at least one element 126 and a learned behavior corresponding to the at least one element 126 exceeds a predefined threshold. In some examples, the processor determines that the at least one element 126 is anomalous based on an analysis of the at least one element 126 with respect to learned behavior 128. The processor executes the instructions 908 to, based on a determination that the requested or executed encryption operation with respect to the cloud storage device is anomalous, at least one of output an alert and perform a remedial action.

According to examples, the processor outputs the alert to at least one entity, e.g., a person or an application, that is to act on the alert. That is, the alert may inform the at least one entity of the request for or the execution of the encryption operation on the cloud storage device 114. The at least one entity may take some action based on receipt of the alert, e.g., block the request, block other requests, initiate other remedial actions, etc. In addition, or alternatively, according to examples, the processor performs a remedial action that blocks an attack on the cloud storage device 114 and/or attacks on other cloud storage devices 114.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory memory on which is stored machine-readable instructions that when executed by the processor, cause the processor to:
      determine that an encryption operation has been requested or executed through a cloud control plane capability with respect to a cloud storage device;
      identify at least one element associated with the request or execution of the encryption operation;
      determine whether a difference between the identified at least one element and a learned behavior corresponding to the at least one element exceeds a predefined threshold;
      determine that the requested or executed encryption operation with respect to the cloud storage device is anomalous based on the determination that the difference exceeds the predefined threshold; and
      based on a determination that the requested or executed encryption operation with respect to the cloud storage device is anomalous, at least one of:
         output an alert; and
         perform a remedial action.

2. The apparatus of claim 1, wherein the instructions cause the processor to:
   determine whether the identified at least one element is anomalous with respect to the learned behavior associated with the request or execution of the encryption operation; and
   determine that the request or execution of the encryption operation with respect to the cloud storage device is anomalous based on the determination that the identified at least one element is anomalous with respect to a learned behavior.

3. The apparatus of claim 2, wherein the instructions cause the processor to:
   learn the behavior associated with the request or execution of the encryption operation through application of a machine learning operation on past behavior associated with requests and executions of encryption operations.

4. The apparatus of claim 1, wherein the requested encryption operation comprises a request to encrypt the cloud storage device using an encryption key, and wherein the instructions cause the processor to:
   identify the at least one element as associated with the request to encrypt the cloud storage device;
   determine that the at least one element associated with the request to encrypt the cloud storage device is anomalous; and
   based on a determination that the at least one element associated with the request is anomalous, at least one of:
      output the alert; and prevent the cloud storage device from being encrypted responsive to the request to encrypt the cloud storage device to perform the remedial action.

5. The apparatus of claim 1, wherein the executed encryption operation comprises the cloud storage device being encrypted using an encryption key, and wherein the instructions cause the processor to:
identify the at least one element as associated with the encryption of the cloud storage device;
determine that the identified at least one element associated with the encryption of the cloud storage device is anomalous; and
based on the identified at least one element being determined to be anomalous, at least one of:
output the alert; and
prevent a decryption key corresponding to the encryption key from being deleted from a key storage device to perform the remedial action.

6. The apparatus of claim 1, wherein the requested encryption operation comprises a request to delete a decryption key from a key storage device, and wherein the instructions cause the processor to:
identify the at least one element as associated with the request to delete the decryption key from the key storage device;
determine that the at least one element associated with the request to delete the decryption key from the key storage device is anomalous; and
based on a determination that the at least one element associated with the request is anomalous, at least one of:
output the alert; and
prevent the decryption key from being deleted from the key storage device to perform the remedial action.

7. The apparatus of claim 1, wherein: the at least one element comprises a length of time between when the cloud storage device was encrypted using an encryption key associated with the decryption key and when the request to delete a decryption key was received; and the executed encryption operation comprises a request to delete the decryption key from a key storage device, and wherein the instructions cause the processor to:
identify the length of time between when the cloud storage device was encrypted using the encryption key associated with the decryption key and when the request to delete the decryption key was received;
determine that the identified length of time falls below a predefined time period; and
determine that the request to delete the decryption key from the key storage device is anomalous based on the identified length of time falling below the predefined time period.

8. The apparatus of claim 1, wherein the executed encryption operation comprises a deletion of a decryption key from a key storage device, and wherein the instructions cause the processor to:
identify at the least one element as associated with the deletion of the decryption key from the key storage device;
determine that the at least one element associated with the deletion of the decryption key from the key storage device is anomalous; and
based on a determination that the at least one element associated with the deletion of the decryption key is anomalous, at least one of:
output the alert; and
prevent another decryption key from being deleted from the key storage device to perform the remedial action.

9. The apparatus of claim 1, wherein the instructions cause the processor to:
output a notification to a requester of the encryption operation to provide additional authentication information: and
based on a determination that the additional authentication information fails to authenticate the requester, perform the remedial action.

10. A method comprising:
determining, by a processor, that an encryption operation with respect to an encryption of a cloud storage device has been requested or executed;
identifying, by the processor, at least one element associated with the request or execution of the encryption operation;
determining whether a difference between the at least one element and learned behavior corresponding to the at least one element exceeds a predefined threshold
determining, by the processor, whether the at least one element associated with the requested or executed encryption operation is anomalous based on the determination that the difference exceeds the predefined threshold; and
based on a determination that the requested or executed encryption operation with respect to the cloud storage device is anomalous, at least one of:
outputting, by the processor, an alert; and
performing, by the processor, a remedial action.

11. The method of claim 10, wherein the requested encryption operation comprises a request to encrypt the cloud storage device using an encryption key, and wherein the method further comprises:
determining that the at least one element associated with the request to encrypt the cloud storage device is anomalous; and
based on a determination that the at least one element associated with the request is anomalous, at least one of:
outputting the alert; and
preventing the cloud storage device from being encrypted responsive to the request to encrypt the cloud storage device to perform the remedial action.

12. The method of claim 10, wherein the executed encryption operation comprises the cloud storage device being encrypted using an encryption key, and wherein the method further comprises:
determining that the identified at least one element associated with the encryption of the cloud storage device is anomalous; and
based on the identified at least one element being determined to be anomalous, at least one of:
outputting the alert; and
preventing a decryption key corresponding to the encryption key from being deleted from a key storage device to perform the remedial action.

13. The method of claim 10, wherein the requested encryption operation comprises a request to delete a decryption key from a key storage device, and wherein the method further comprises:
determining that at least one element associated with the request to delete the decryption key from the key storage device is anomalous; and based on a determination that the at least one element associated with the request is anomalous, at least one of:
outputting the alert; and
preventing the decryption key from being deleted from the key storage device to perform the remedial action.

14. The method of claim 10, wherein: the at least one element comprises a length of time between when the cloud storage device was encrypted using an encryption key associated with the decryption key and when the request to delete a decryption key was received; the executed encryption operation comprises a request to delete the decryption key from a key storage device, and wherein the method further comprises:
identifying the length of time between when the cloud storage device was encrypted using an encryption key associated with the decryption key and when the request to delete the decryption key was received;
determining whether the identified length of time falls below a predefined time period;
determining that the request to delete the decryption key from the key storage device is anomalous based on the identified length of time falling below the predefined time period; and
at least one of:
outputting the alert; and
preventing the decryption key from being deleted from the key storage device to perform the remedial action.

15. The method of claim 10, wherein the executed encryption operation comprises a deletion of a decryption key from a key storage device, and wherein the method further comprises:
determining that the at least one element associated with the deletion of the decryption key from the key storage device is anomalous; and
based on a determination that the at least one element associated with the deletion of the decryption key is anomalous, at least one of:
outputting the alert; and
preventing another decryption key from being deleted from the key storage device to perform the remedial action.

16. A non-transitory computer-readable medium on which is stored a plurality of instructions that when executed by a processor, cause the processor to:
determine that an encryption operation with respect to an encryption of a cloud storage device has been requested through or executed by a cloud control plane capability available from a cloud service provider;
identify at least one element associated with the request or execution of the encryption operation;
determine that the at least one element associated with the requested or executed encryption operation is anomalous based on a difference between the at least one element and a learned behavior corresponding to the at least one element exceeding a predefined threshold; and
based on a determination that the requested or executed encryption operation with respect to the cloud storage device is anomalous, at least one of:
output an alert; and
perform a remedial action.

17. The non-transitory computer-readable medium of claim 16, wherein the requested encryption operation comprises a request to encrypt the cloud storage device using an encryption key, and wherein the instructions cause the processor to:
determine that the at least one element associated with the request to encrypt the cloud storage device is anomalous; and
based on a determination that the at least one element associated with the request is anomalous, at least one of:
output the alert; and
prevent the cloud storage device from being encrypted responsive to the request to encrypt the cloud storage device to perform the remedial action.

18. The non-transitory computer-readable medium of claim 16, wherein the requested encryption operation comprises a request to delete a decryption key from a key storage device, and wherein the instructions cause the processor to:
determine that at least one element associated with the request to delete the decryption key from the key storage device is anomalous; and
based on a determination that the at least one element associated with the request is anomalous, at least one of:
output the alert; and
prevent the decryption key from being deleted from the key storage device to perform the remedial action.

19. The non-transitory computer-readable medium of claim 16, wherein the executed encryption operation comprises a deletion of a decryption key from a key storage device, and wherein the instructions cause the processor to:
determine that the at least one element associated with the deletion of the decryption key from the key storage device is anomalous; and
based on a determination that the at least one element associated with the deletion of the decryption key is anomalous, at least one of:
output the alert; and
prevent another decryption key from being deleted from the key storage device to perform the remedial action.

* * * * *